(12) United States Patent
Desoto-Burt et al.

(10) Patent No.: US 9,321,228 B2
(45) Date of Patent: Apr. 26, 2016

(54) PROCESS FOR THE MANUFACTURE OF AN ARTICLE COMPRISING A RECESS

(75) Inventors: Widalys Luz Desoto-Burt, Cincinnati, OH (US); Johann Gottlieb Künz, Hard (AT); Christian Gerhard Friedrich Gerlach, Brussels (BE); Brian David Andres, Harrison, OH (US); Su-Yon McConville, Mason, OH (US); Alfredo Pagan, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/391,488

(22) PCT Filed: Jan. 10, 2012

(86) PCT No.: PCT/US2012/020693
§ 371 (c)(1),
(2), (4) Date: Feb. 21, 2012

(87) PCT Pub. No.: WO2012/096905
PCT Pub. Date: Jul. 19, 2012

(65) Prior Publication Data
US 2013/0300037 A1 Nov. 14, 2013

Related U.S. Application Data

(60) Provisional application No. 61/432,690, filed on Jan. 14, 2011.

(51) Int. Cl.
*B29C 49/78* (2006.01)
*B29D 22/00* (2006.01)
(Continued)

(52) U.S. Cl.
CPC .............. *B29D 22/003* (2013.01); *B29C 49/18* (2013.01); *B29C 49/185* (2013.01); *B29C 49/4815* (2013.01); *B29C 49/54* (2013.01); *B65D 1/02* (2013.01); *B29C 49/04* (2013.01); *B29C 49/06* (2013.01); *B29C 49/12* (2013.01); *B29C 49/58* (2013.01); *B29C 2049/4807* (2013.01); *B29C 2049/543* (2013.01); *B29C 2791/007* (2013.01);
(Continued)

(58) Field of Classification Search
CPC .... B29C 49/04; B29C 49/20; B29C 47/0023; B29C 49/54; B29C 49/541; B29C 49/542; B29C 49/543; B29C 49/4802; B29C 2049/4861; B29C 2049/4887
USPC ......... 264/522, 525, 529, 532, 533, 536–538, 264/540, 318, 523, 530, 541; 425/318, 523, 425/532, 540, 522, 525, 529, 530, 536–538, 425/DIG. 58
See application file for complete search history.

(56) References Cited

U.S. PATENT DOCUMENTS 4,251,366 A * 2/1981 Simon et al. ................... 210/767
4,883,631 A * 11/1989 Ajmera ......................... 264/528
(Continued)

OTHER PUBLICATIONS

U.S. Appl. No. 13/350,374, filed Jan. 13, 2012, Christian Gerhard Friedrich Gerlach.
(Continued)

*Primary Examiner* — Yogendra Gupta
*Assistant Examiner* — Kimberly A Stewart
(74) *Attorney, Agent, or Firm* — Linda M. Sivik

(57) ABSTRACT

The present invention relates to a process for blowing an article with at least one recess.

6 Claims, 3 Drawing Sheets

(51) Int. Cl.
  B29C 49/18 (2006.01)
  B29C 49/48 (2006.01)
  B29C 49/54 (2006.01)
  B65D 1/02 (2006.01)
  B29C 49/04 (2006.01)
  B29C 49/06 (2006.01)
  B29C 49/12 (2006.01)
  B29C 49/58 (2006.01)
  B29K 23/00 (2006.01)
  B29K 67/00 (2006.01)
  B29L 31/00 (2006.01)

(52) U.S. Cl.
  CPC .......... *B29C 2949/78537* (2013.01); *B29C 2949/78663* (2013.01); *B29C 2949/78899* (2013.01); *B29K 2023/06* (2013.01); *B29K 2023/12* (2013.01); *B29K 2067/003* (2013.01); *B29K 2067/046* (2013.01); *B29L 2031/712* (2013.01)

(56) References Cited

U.S. PATENT DOCUMENTS

| | | | |
|---|---|---|---|
| 5,505,612 A | 4/1996 | Mero et al. | |
| 5,921,416 A | 7/1999 | Uehara | |
| 5,962,039 A * | 10/1999 | Katou et al. | 425/210 |
| 6,074,596 A * | 6/2000 | Jacquet | 264/529 |
| 6,357,625 B2 | 3/2002 | Kimble et al. | |
| 7,153,127 B2 * | 12/2006 | Struble et al. | 425/525 |
| D573,469 S | 7/2008 | Lamb et al. | |
| 2005/0170035 A1 | 8/2005 | Chen | |
| 2012/0181209 A1 | 7/2012 | Desoto-Burt | |
| 2012/0181272 A1 | 7/2012 | Desoto-Burt | |
| 2012/0181278 A1 | 7/2012 | Pagan | |
| 2012/0181292 A1 | 7/2012 | Desoto-Burt | |

OTHER PUBLICATIONS

U.S. Appl. No. 13/350,436, filed Jan. 13, 2012, Christian Gerhard Friedrich Gerlach.
The Wiley Encyclopedia of Packaging Technology, Edited by Brody, A.L. and Marsh, K.S., John Wiley & Sons, Inc., 2nd Edition, 1997, pp. 914 to 921.
International Search Report; PCT/US2012/020869; Mailing Date Jun. 8, 2012; 8 pages.
International Search Report; PCT/US2012/020869; Mailing Date Aug. 20, 2012; 16 pages.
International Search Report; PCT/US2012/020693; Mailing Date Jun. 8, 2012; 8 pages.
International Search Report; PCT/US2012/020693; Mailing Date Aug. 20, 2012; 17 pages.
International Search Report; PCT/US2012/021203; Mailing Date Jun. 8, 2012; 9 pages.
International Search Report; PCT/US2012/021203; Mailing Date Aug. 20, 2012; 16 pages.

* cited by examiner

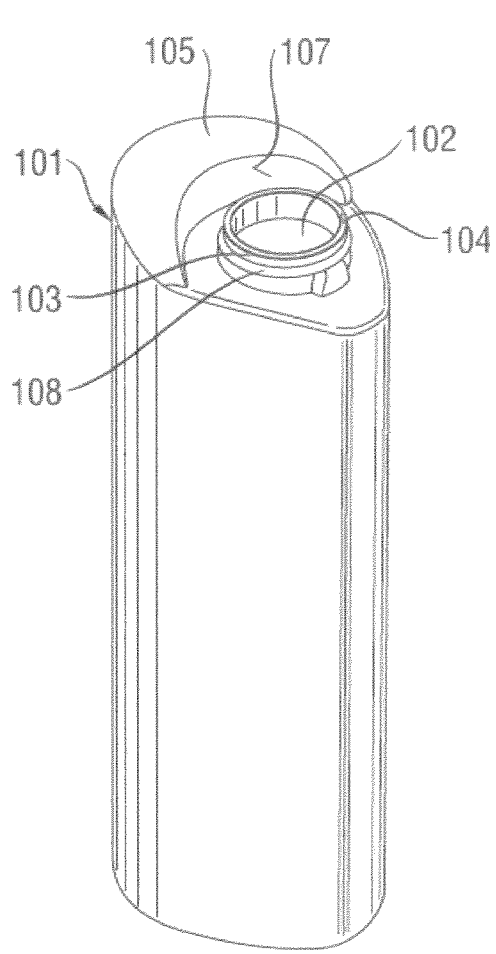 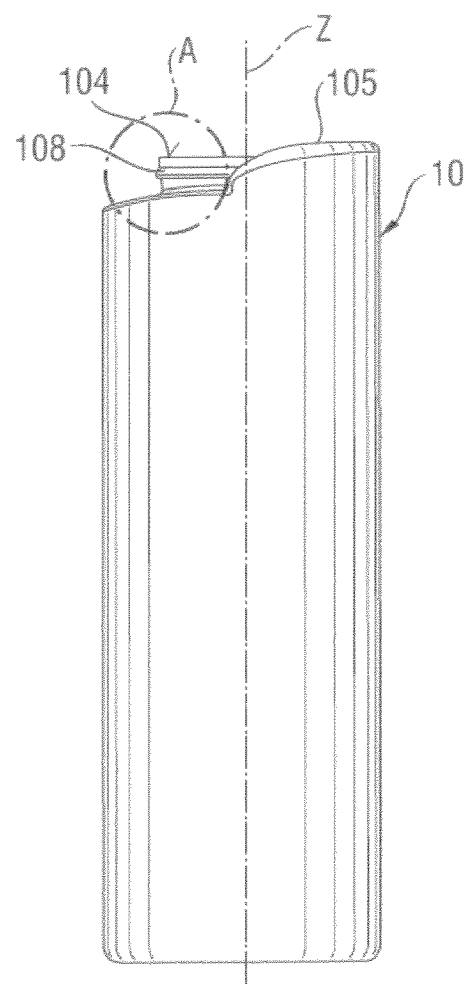
Fig. 1A  Fig. 1B
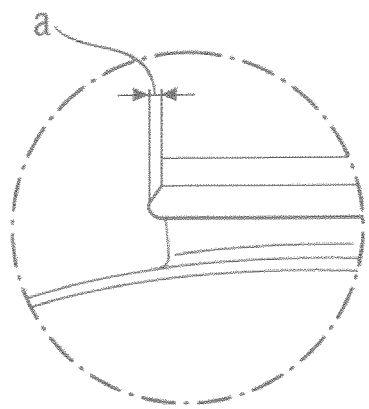 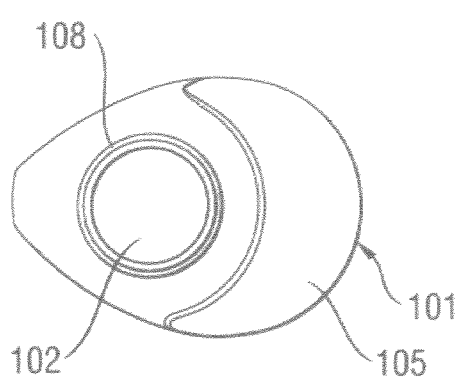
Fig. 1C  Fig. 1D

PROCESS FOR THE MANUFACTURE OF AN ARTICLE COMPRISING A RECESS

CROSS REFERENCE TO RELATED APPLICATION

This application claims the benefit of U.S. Provisional Application No. 61/432,690, filed Jan. 14, 2011.

FIELD OF INVENTION

The present invention relates to a process for blow-molding an article comprising at least one recess, and wherein said recess is located proximal to an opening portion of the article for association of a closure to said article. In particular, the present invention relates to simplifying the de-molding of articles comprising recesses generating undercuts, whilst preventing damage to the article during such operation.

BACKGROUND OF THE INVENTION

The formation of a recess in a blow molded article, wherein said recess is located proximal to an opening portion of the article, is highly desirable as it enables the integration of the design of the closure with the design of the article. This integration in turn allows the manufacturer to form consumer pleasing designs whilst making closure functioning intuitive to the user. More desirable still is the integration of the closure with the article such that the closure can be miniaturized. This miniaturization of the closure is desired as it reduces the weight of the closure thus reducing the amount of raw material and energy consumed. A further advantage is that stability of the article may be attained in both top side up and inverted positions, this thanks to the flat surface generated by article and closure.

The manufacture of a blown article comprising at least one recess, wherein said recess is located proximal to an opening portion of the article, is technically challenging. This is because the formation of a recessed neck requires the article to form a shoulder(s) above the top portion of the neck portion. This is technically challenging because the material flow to form such shoulders would be against the natural material flow in blow molding. The natural material flow in blow molding is from the neck of the parison or preform towards the base of the article guided by a pressure build up that expands the walls of said article being formed to the shape of the mold cavity. Moving material against that natural flow direction requires careful design of the parison or preform, and careful definition of the blowing process.

Another challenge is that, such shoulder being above the neck, generates undercuts during the blow molding process which prevents the unmolding the finished article when using known unmolding processes. This is particularly true if such shoulder presents multiple curves on its surface. One cannot unmold an article with such undercuts without damaging the article.

The art contains a number of attempts to solve the inherent problems of forming recessed blow molded articles.

One approach has been to form containers having recesses that do not generate undercuts, such as those described in USD573469 (The Procter & Gamble Company). Such recesses allow unmolding with a simple "straight-pull" action from a standard mold. However, such recessed geometries that can be unmolded with a straight pull in a blow mold are highly restrictive in terms of design of the recess geometry that may be obtained. This in turn limits the degree of integration of the closure with the blown article and thus fails to attain the above stated benefits.

Another approach has been to blow mold the article in a mold cavity followed by a second step of trimming (or deflashing) the excess plastic in order to finish the geometry of the recess. An example of this approach is described in U.S. Pat. No. 6,357,625 (OWENS-BROCKWAYS PLASTIC PRODUCTS). However, a number of disadvantages arise with the use of such a process which become apparent to the person skilled in the art. Firstly, the operation of trimming excess material is inherently cost ineffective and should thus be avoided. Secondly, any trimming operation requires complete access to the portion that is to be trimmed, thus restricting the recess geometry that may be obtained. Thirdly, such restriction of the recess geometry limits the integration of the closure with the blown article and thus also fails to attain the above stated desired benefits.

It is an objective of the present invention to provide a process for the production of a blow molded article, comprising a recess that integrates, at least with part, of the closure, such that the closure, when coupled with the blown article, may be substantially flush to the apex of the outmost surface of said article.

It is another objective of the present invention to provide a blow molding process forming a recess in the blown article, such that at least a portion of said article wraps around at least a part of a closure when coupled to the blown article.

It is a further objective of the present invention to simplify the de-molding of articles comprising undercuts proximal to the neck portion thereof, whilst preventing damage to the article during such operation.

SUMMARY OF THE INVENTION

The present invention relates to a process for the manufacture of a blow molded article comprising an integral neck portion and at least one recess proximal to said neck portion. Said process comprises the steps of: blowing an article in a mold cavity, preferably forming an integral neck portion and at least one recess proximal thereto; opening the mold via a first displacement of at least one first portion of the mold, preferably proximal to the neck portion, and a subsequent at least second displacement of at least two segments of a second portion of the mold wherein said first and second displacements are about a first and second plane, preferably said first and second planes are perpendicular relative to each other; and ejecting the finished article.

BRIEF DESCRIPTION OF THE DRAWINGS

FIG. 1A illustrates an isometric view of a blown article formed by a process according to an embodiment of the present invention.

FIG. 1B illustrates a side view of the blown article of FIG. 1A.

FIG. 1C illustrates an enlargement of section A of FIG. 1B.

FIG. 1D illustrates a top view of the article of FIG. 1B.

DETAILED DESCRIPTION OF THE INVENTION

Figure 1E:
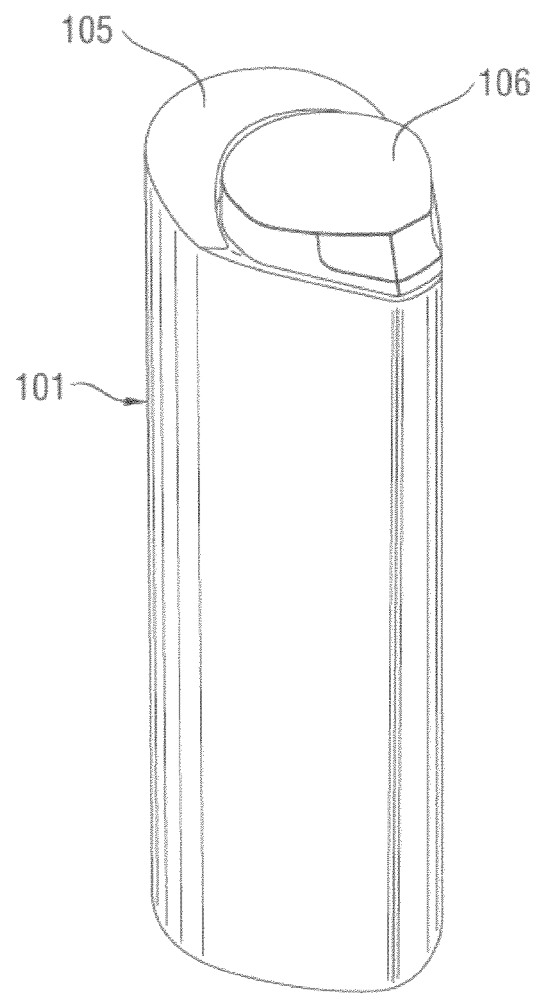
FIG. 1E is an isometric view of a blown article formed by a process according to an embodiment of the present invention coupled to a closure.

The term undercut as used herein means that at least one portion of the molded article, comprises a physical geometry that hinders the removal of the article from the mold when said mold is opened in a direction which intersects at least a portion of said geometry.

The "z-axis" as used herein is the longitudinal axis Z (or centerline of the article).

The "x-y" plane as used herein is the plane substantially perpendicular to the z-axis.

The term "preform" as used herein is a molded element which is produced prior to expansion to form the finished article. A preform is necessarily somewhat smaller than the finished blown article. A preform is generally produced by, for example injection molding, at an elevated temperature in excess of the melt temperature.

The term "stretch-blow molding" as used herein is the process in which preforms are heated above their glass transition temperature, and then blown in molds using a high pressure medium, preferably air, to form hollow articles, such as containers. Usually the preform is stretched with a stretch rod as part of the process.

As used herein "recycled" materials encompass post-consumer recycled (PCR) materials, post-industrial recycled (PIR) materials, and mixtures thereof.

As used herein "regrind" material is thermoplastic waste material, such as sprues, runners, excess parison material, and reject parts from injection and blow molding and extrusion operations, which has been reclaimed by shredding or granulating.

As used herein the prefix "bio-" is used to designate a material that has been derived from a renewable resource.

The invention is directed to a process for the manufacture of a blow molded article comprising an integral neck portion and at least one recess proximal to said neck portion. Said process comprises the steps of: blowing an article in a mold cavity, preferably forming an integral neck portion and at least one recess proximal thereto; opening the mold via a first displacement of at least one first portion of the mold, preferably proximal to the neck portion, and a subsequent at least second displacement of at least one second portion of the mold wherein said first and second displacements are about a first and second plane, preferably said first and second planes are perpendicular relative to each other; and ejecting the finished article.

For the purposes of the present invention, suitable recesses are those that permit a portion of the article to wrap around at least part of a closure, when said closure is coupled with said article. Such recess may allow the closure, when coupled to said article, to remain substantially flush to the apex of the outermost surface of said article. By "at least part of a closure" it is herein intended that said portion extends around the perimeter of the closure to form an angle of at least 45°, preferably at least 60°, more preferable between 60° and 360°, taken from the centre of the closure and in the x-y plane, when said closure is coupled to said article.

The following sections will illustrate the embodiments of the present invention with reference to the drawings. Firstly, the articles made by the process of the present invention and suitable closures will be discussed, followed by a detailed description of the preferred embodiments of the process according to the present invention.

The Article

Articles formed by the process of the present invention may comprise more than one undercut, preferably at least two undercuts, more preferably at least three undercuts, and even more preferably at least four undercuts, proximal to the neck portion thereof. Particularly preferred geometries generating such undercuts are those that comprise at least one curved surface, preferably a concave surface.

Articles made by the process of the present invention may be selected from the group consisting of containers, devices, handles, implements and combinations thereof. Preferred articles are containers for use in a variety of fields. Non-limiting examples of such fields are; beauty care products, such as containers for body wash, shampoos and conditioners; domestic and/or household products, such as containers for detergents or other cleaning preparations for cleaning and/or conditioning fabric and/or hard surfaces; oral care products, such as containers for mouth wash; and so on.

Articles made by the process of the present invention can be made of any suitable plastic resin material. Preferred plastic resin materials for use in the present invention can be polyolefins (such as PP and PE), polystyrene (PS), polyvinyl chloride (PVC), polylactic acid (PLA) or polyethylene terephthalate (PET). In one embodiment, the plastic resin material is polyethylene terephthalate (PET). Alternatively, articles made by the process of the present invention may be made of sustainable materials selected from the group consisting of renewable materials, recycled materials, regrind materials, and mixtures thereof.

Examples of "renewable materials" include bio-polyethylene, bio-polyethylene terephthalate, and bio-polypropylene. As used herein and unless otherwise stated, "polyethylene" encompasses high density polyethylene (HDPE), low density polyethylene (LDPE), linear low density polyethylene (LLDPE), and ultra low density polyethylene (ULDPE). As used herein and unless otherwise stated, "polypropylene" encompasses homopolymer polypropylene, random copolymer polypropylene, and block copolymer polypropylene.

Referring to FIG. 1A-E, said article (101) may be a container comprising an opening (102) defined by a neck portion (103), said neck portion (103) may comprise a top surface (104). At least one portion of the top surface (104) of said neck portion (103) may be below at least one portion of the uppermost surface of said article taken along an axis extending parallel to the centerline (or z-axis) of said article (101). The uppermost portion of said article may be in the form of at least one shoulder (105), preferably said shoulder extends parallel to at least a portion of the perimeter of said neck portion (103) so as to define a recess proximal to said neck portion (103). The recess may be located between said shoulder (105) and said neck portion (103). The advantage of such configuration is that it allows fitting of a closure (106) to be substantially sunk into the blown article. By "sunk into" it is herein intended that at least one surface of said closure (106) remains substantially flush with at least one surface of said article, preferably said at least one surface of said article is on the outer surface of said shoulder (105). Preferably said at least one surface is the uppermost surface taken along a plane substantially parallel to the centerline of said article.

In an embodiment, at least one portion of said recess is substantially concave in shape. This configuration has the advantage of reducing the gap between the closure (106) and the article when the two are coupled together. However, this geometrical complexity results in problematic unmolding using current processes. Indeed, such recesses do not allow unmolding of the article with traditional straight-pull movement during mold opening.

In one embodiment at least part of the interface between the portion of the article (101) wherein said closure (106) is fitted and the portion of the closure (106) in facing relationship thereto, presents a geometry that is selected from the group consisting of concave, convex, linear, non-linear and combinations thereof. Preferably said interface is along at least one surface of said shoulder (105).

In another embodiment, articles made by the process of the present invention may comprise a non-linear geometry proximal to said neck portion (103). The curvature of said non-linear geometry may allow a portion of the article to wrap around at least part of the closure (106), once said closure is fitted onto said article. Preferably said portion of the article wrapping around at least part of the closure (106) is at least one surface of said shoulder (105), more preferably the inner surface (107) of said shoulder (105) facing the neck portion of said article.

In one embodiment, the inner surface (107) of said shoulder (105) may comprise a positive draft angle of less than 10°, preferably less than 8°, more preferably less than 5°. Such draft angle is defined as the angle of a surface taken from a plane perpendicular to the mold parting line formed on said surface. Having a positive draft angle of less than 10° may be important for several reasons including, consumer acceptance and potential re-application of the same closure across a range of article sizes. Without being bound by theory it is believed that the smaller the draft angle, the smaller the space or gap that will exist between the article and the closure after said closure is assembled thereon. Thus achieving a more aesthetically pleasing design and a winning consumer acceptance. Furthermore, having a low positive draft angle on the inner surface (107) of said shoulder (105) enables the utilization of closures with no or low positive draft angles. Closures having a low positive draft angle may then be used with a variety of different shoulder designs and/or with articles not having a shoulder at all. This results in greater flexibility as the same closure may be used across a wide variety of articles thus creating scale, which in turn typically reduces costs and logistic complexity.

In a preferred embodiment, articles made by the process of the present invention may include a closure retention mechanism (108) that can be selected from the group consisting of snap bead, thread, and combinations thereof. Said closure retention mechanism (108) may protrude from at least one section of the perimeter of said neck portion (103), preferably said closure retention mechanism (108) is located proximal to the top surface (104) of said neck portion (103). It will be apparent to the person skilled in the art that such protrusions will further complicate the un-molding of the article. Indeed, such closure retention mechanism (108) will hinder the removal of said article from the mold in a direction substantially perpendicular to the horizontal "x-y" plane.

In one embodiment, said closure retention mechanism (108) may protrude for a distance "a" from a proximal end to a distal end. Typically, said proximal end is closer to the z axis than said distal end. Preferably said distance "a" is taken along a plane substantially perpendicular to said z axis. In one embodiment the distance "a" is less than 3 mm, preferably less than 2 mm, more preferably between 0.5 mm and 2 mm, most preferably between 0.5 mm and 1.5 mm.

The Closure

Closures that may be used with articles made by the process of the present invention are any that are suitable for compliance with said articles.

In one embodiment, the closure (106) may be capable of coupling with said article (101), preferably said closure (106) comprises a coupling means (not shown) that interacts with said closure retention mechanism (108) to secure said closure (106) onto said article (101).

In one embodiment, said closure (106), when coupled to said article, may provide for fluid communication between the interior and exterior of said article via a passage when said closure (106) is in a first position. When said closure (106) is moved to a second position, said passage is blocked and fluid communication is interrupted. Accordingly said closure (106) may be moved from said first position to said second position and vice versa. Preferably the movement from said first position to said second position is selected from the group consisting of translational, rotational and combinations thereof.

The Process

Blow molding is a well known manufacturing process for the fabrication of plastic articles such as containers, fuel tanks, handles etc. The blow molding process begins with melting down plastic and forming it into a parison or preform. The parison is then clamped into a mold and a pressurized medium, usually air, is blown or pumped into it. The air pressure forces the plastic to match the peripheral geometry of the mold. Once the plastic has cooled and hardened the mold opens up and the part is ejected.

There are three main types of blow molding platforms: extrusion blow molding (EBM), injection blow molding (IBM) and stretch blow molding (SBM). In some applications the combination of the abovementioned blow molding platforms may be more appropriate depending on the properties and complexity of the articles to be formed, such as injection stretch blow molding (ISBM).

De-molding recessed articles comprising multiple undercuts may be achieved by a process utilizing a particular mold design comprising a number of parting lines, defining a number of mold portions, the process comprising the action of displacing said mold portions in a predetermined manner. The advantage of such process is that complex recess geometries generating a plurality of undercuts may be formed directly by blowing. The sections of the mold that would normally be trapped by said undercuts are divided into a plurality of mold portions and displaced in more phases to enable ejecting the finished article without damage.

In a particular example of the above embodiment, a mold and mold cavity may be designed to have an upper part, proximal to the neck portion, divided from the body part of the mold cavity. The upper part of the mold cavity may include the female shape of the recess to be formed on a surface of the article, while the body part includes the remainder. Without intending to limit the scope of the invention, the body part may generally be divided into two body part halves (or segments) that together form the entire body part and may be opened during the ejection of the blown article. Typically, the body part of the mold cavity may further be divided, preferably by means of a base part of the blow cavity that is dedicated to forming the base of the article. Translation of the base part typically occurs before the opening of the remaining body part.

Figure 2A:
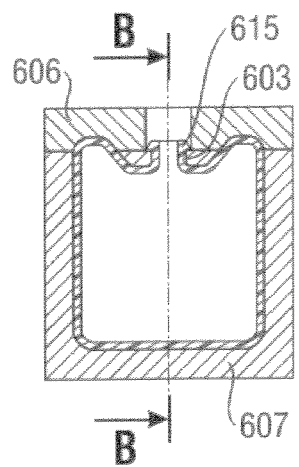
FIG. 2A illustrates a cross-section of a mold with a blown container therein for a process according to an embodiment of the present invention.
Figure 2B:
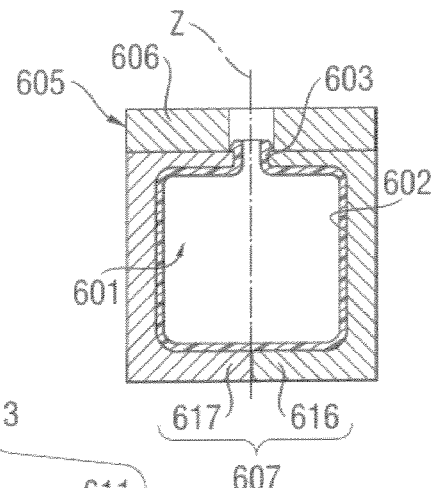
FIG. 2B and FIG. 2C illustrate a cross-section of a mold of FIG. 5A taken from BB.
Figure 2C:
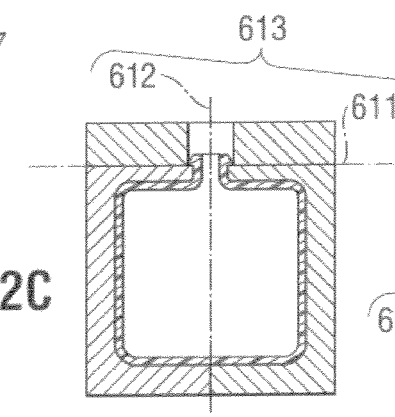
Figure 2D:
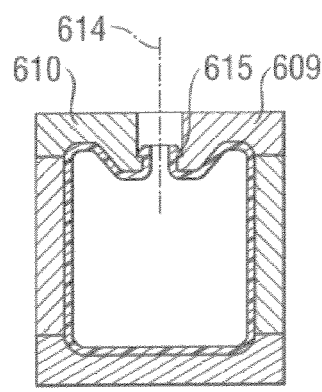
FIGS. 2D and 2E illustrate a cross-section of a mold for a process according to an embodiment of the present invention.
Figure 2E:
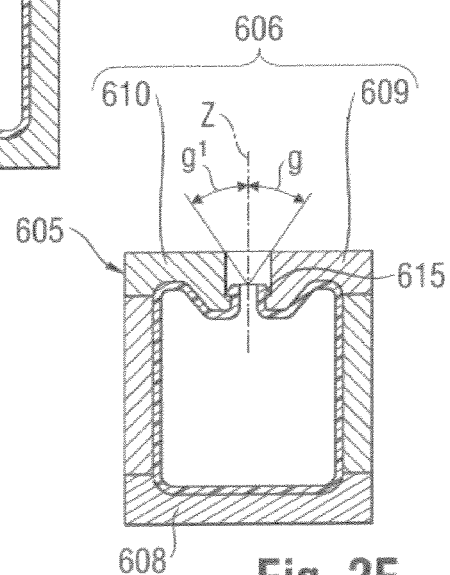
Figure 2F:
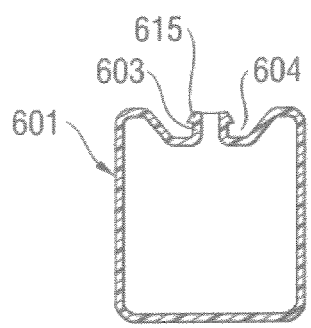
FIG. 2F illustrates a cross-section of an article formed by a process according to an embodiment of the present invention.

Referring to FIG. 2A-F, the process according to the abovementioned embodiment may comprise the steps of:
 (i) Blowing an article (601) in a mold cavity (602), preferably forming an integral neck portion (603) and at least one recess (604) proximal thereto;
 (ii) Opening the mold (605) via a first displacement of at least one first portion (606) of the mold (605), preferably proximal to the neck portion (603), and a subsequent at least second displacement of at least two segments (616, 617) of a portion (607) of the mold (605) wherein said first and second displacements are about a first and second plane, preferably said first and second planes are perpendicular relative to each other; and (iii) Ejecting the finished article.

In one embodiment, the displacements (both first and second displacements) in step (ii) may be selected from the group consisting of translational, rotational, and combinations thereof. The actual translation to be used may depend on the design of the recess. In an embodiment said second displacement may be a linear translation.

In a preferred embodiment the mold (605) is opened via several displacement phases occurring in step (ii). The first phase may comprise the displacement of the first portion (606) away from the second portion (607), namely the body part, in a direction substantially parallel to the z-axis. The second phase may comprise the displacement of at least two segments (616, 617) of the second portion (607) each in a substantially opposite direction, preferably in a direction perpendicular to the z-axis. If the mold (605) comprises a base part (608), then said base part (608) is displaced away from said second portion (607) prior to said second phase, preferably in a direction substantially parallel to the z-axis.

In another preferred embodiment, said first portion (606) is itself divided into at least two sections: namely a right first portion (609) and a left first portion (610). The first phase may now comprise an additional displacement prior to displacing the first portion (606) away from said second portion (607). Said additional displacement being the right first portion (609) moving away from the left first portion (610) in a substantially opposite and mirrored direction taken from the z-axis.

In one embodiment, said mold (605) may comprise at least two parting lines (613) forming an angle of greater than 10° at the point of intersection. Preferably said angle of greater than 10° is taken starting from point on a plane perpendicular to the z axis. The at least two parting lines (613) may comprise at least one first parting line (611) which may extend along the cross-sectional diameter of the mold (605) in the x-y plane and at least one second parting line (612) which may extend along the z axis. It is however understood that said first and second parting lines (611, 612) may extend at any angle relative to said respective x-y plane and said z-axis. In an embodiment said at least one first parting line (611) may be located at least ½, preferably at least ¾, of the total height of said mold (605) taken from the furthest position on the article from the neck portion (603) and along the z axis. In a preferred embodiment said at least two parting lines (613) are perpendicular relative to each other. The parting lines (613) may have a number of forms and/or geometries. For example, said parting lines (613) may be substantially linear, curvilinear and/or angular in a two-dimensional and/or three-dimensional space. By "two-dimensional" it is herein intended that such geometry is present over a single plane of a solid object, typically one of the Cartesian planes. By "three-dimensional" it is herein intended that such geometry and/or form is present over more than one planes of a solid object. Preferably at least one of said parting lines (613) is substantially linear, curvilinear and/or angular in a three-dimensional space. This configuration may introduce several advantages, such as allowing the forming of articles presenting multiple curves on the outer surface whilst making sure that quality of subsequent labeling is not affected. Indeed, forming articles with molds comprising parting lines results in the generation of very small protrusions (or flanges) corresponding to the profile of the parting line due to the high pressure of forming in combination with the small gap formed between mold portions. Without being bound by theory it is believed that a three-dimensional parting line allows to carefully locate these protrusions in areas which are less likely to be noticed by human eye upon the application of a label and are preferred for proper labeling of the finished blown article.

In one embodiment said first portion (606) of the mold (605) may be integral with a blow nozzle, preferably said first portion is proximal to the neck portion (603) being formed. In this embodiment said first portion (606) may displace together with said blow nozzle.

In a further embodiment said first portion (606) may itself comprise at least one third parting line (614) proximal to the neck portion (603) of the article being formed. This may allow displacement of the first portion (606) away from the z-axis in such a way to permit the unmolding of a closure retention mechanism (615) without damage. Preferably, said third parting line(s) (614) divides said at least one first portion (606) of the mold (605) into at least one right first portion (609) and at least one left first portion (610). In one embodiment said third parting line (614) extends along the same plane as said second parting line (612).

In one embodiment, step (i) may comprise the step of forming at least one closure retention mechanism (615) forming a second undercut. Preferably said closure retention mechanism (615) is formed together with the entire shape of the article. More preferably said closure retention mechanism (615) is formed by at least one surface of the inner wall of the first portion (606) of the mold. Even more preferably, said closure retention mechanism (615) is formed by at least one surface of either right first portion (609) and/or left first portion (610).

In one embodiment said mold (605) may be opened via the steps of:

(a) A first displacement of said at least one right first portion (609) and a substantially simultaneous displacement of said at least one left first portion (610);

(b) A subsequent at least second displacement of said at least two segments (616, 617) of a second portion (607) of the mold (605), preferably step (b) is performed after the displacement of a base part (608), if present; and Wherein, said first displacement is at an angle "g" of less than −10°, preferably between −10° and −45°, taken from the z-axis, and wherein said simultaneous displacement of said at least left first portion (610) is at an angle "g$^1$" of greater than 10°, preferably between 10° and 45°, taken from the z-axis. This allows opening of the mold (605) without plastically deforming and/or damaging the portions of the article forming one or more undercuts. In this embodiment the angles and forces applied will depend on the material properties of the article being formed and the material thickness. Preferably the maximum point of elasticity of the material is not exceeded, particularly during step (a). More preferably the portion of the part proximal to the undercut is subjected to a stress which is below the yield stress of the material being formed.

In another embodiment, the at least one closure retention mechanism (615) may protrude for a distance "a" of less than 3 mm, preferably less than 2 mm, more preferably between 0.5 mm and 2 mm, most preferably between 0.5 mm and 1.5 mm, from a proximal end to a distal end. Without being bound by theory it is believed that a retention mechanism (615) protruding in excess of 3 mm would cause high stress concentrations being generated proximal to the undercut regions. This in turn may lead to plastic deformation of the part, which preferably is to be avoided.

EXAMPLES

Example 1

A bottle is made by extrusion blow molding using a High Density Polyethylene resin (DOW 35060, 0.29 g/10 min @ 190 dC/2.16 kg). The bottle has a recess that is recessed by 8 mm against the snap-on neck of said bottle. A closure is made by injection molding using a Polypropylene resin (BOREALIS RF365MO, 20 g/10 min @ 230 dC/2.16 kg). The closure, when snapped onto the bottle, remains substantially flush with the top surface of the bottle (bottle shoulder). Said bottle shoulder wraps around the closure over a 180 degree arch. The snap bead depth is 1 mm and is formed during blow molding. The bottle is blown in a blow mold that has two upper mold halves that enable proper formation of the recess but are actuated before the remaining blow cavity is opened and the blown bottle ejected. The actuation of the upper mold halves is controlled by the blowing machine and the trajectory of the movement is in a 30 degree angle against the z-axis of the bottle—this trajectory enables to unmold the bottle including the snap-on bead without damage. The bottle cannot be ejected without the movement of the upper mold halves. The mold uses a 3D parting line between the upper part of the mold and the body part. This is required as bottle features a smooth transition from the neck portion into the body of the bottle and without such a 3D parting line the witness line of the mold would be visible to the consumer.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for the manufacture of a blow molded article comprising an integral neck portion (603) and at least one recess proximal thereto, the process comprising the steps of:
   (i) Blowing an article (601) in a mold cavity (602), forming an integral neck portion (603) and at least one recess proximal thereto;
   (ii) Opening the mold (605) via a first displacement of at least one first portion (606) of the mold (605) proximal to the neck portion (603), and a subsequent at least second displacement of at least two segments (616, 617) of a second portion (607) of the mold (605) wherein said first and second displacements are about a first and second plane and further wherein said first and second planes are perpendicular relative to each other; wherein said mold (605) comprises at least two parting lines (613) forming an angle of greater than about 10° at the point of intersection and wherein said at least two parting lines (613) are perpendicular to each other and wherein said mold (605) comprises at least one third parting line (614) dividing said at least one first portion (606) of the mold (605) into at least one right first portion (609) and at least one left first portion (610); and
   (iii) Ejecting the finished article (601).

2. A process according to claim 1 wherein said first portion (606) of the mold (605) is integral with a blow nozzle.

3. A process according to claim 1 wherein the mold (605) is opened via the steps of:
   (a) The first displacement of said at least one right first portion (609) and a substantially simultaneous displacement of said at least one left first portion (610);
   (b) The subsequent at least second displacement of said at least two segments (616, 617); and
wherein, said first displacement of said at least one right first portion (609) is at an angle "g" of less than about −10°, taken from the z-axis, and wherein said substantially simultaneous displacement of said at least one left first portion (610) is at an angle "g$^1$" of greater than about 10°, taken from the z-axis.

4. A process according to claim 3 wherein during step (a) the article is subjected to a stress which is below the yield stress of the material thereof.

5. A process according to claim 3 wherein step (i) comprises the step of forming at least one closure retention mechanism (615) wherein the at least one closure retention mechanism (615) protrudes for a distance "a" of less than about 3 mm, from a proximal end to a distal end.

6. A process according to claim 1 wherein step (i) comprises the step of forming at least one closure retention mechanism (615) generating an additional undercut proximal to said neck portion (603).

* * * * *